United States Patent [19]
Arias

[11] 3,723,677
[45] Mar. 27, 1973

[54] IGNITION KEY ALARM

[76] Inventor: Alan Arias, 3827 Dover Center Rd., North Olmstead, Ohio 44070

[22] Filed: Jan. 5, 1970

[21] Appl. No.: 759

[52] U.S. Cl. ..................................200/44, 200/61.66
[51] Int. Cl. ..............................................H01h 27/00
[58] Field of Search .....340/52 D, 52 F, 56, 52, 52 R; 200/44, 42, 61-66

[56] References Cited

UNITED STATES PATENTS

| | | | |
|---|---|---|---|
| 3,485,969 | 12/1969 | Millen | 200/44 |
| 2,497,340 | 2/1950 | Becker | 200/44 |
| 2,786,194 | 3/1957 | Hermenzie | 340/52 D |
| 3,393,540 | 7/1968 | Rink et al. | 340/52 D |
| 3,513,466 | 5/1970 | Isaacs et al. | 340/63 |

*Primary Examiner*—Herman J. Hohauser

[57] ABSTRACT

An auxiliary, momentary contact, electrical switch with normally open contacts is combined with a rotary ignition or motor starting switch of the type conventionally used in automobiles and other vehicles. The contacts of the auxiliary switch are closed by the ignition key either by inserting this key in the ignition switch or by turning the ignition switch from one of its on positions to its off position. The auxiliary switch forms part of an electrical circuit comprising an electrical storage battery, an interval timer, and a buzzer. The combination of the above elements works so that if the ignition key is left for more than a few seconds in the ignition switch while this ignition switch is in its off position the buzzer is turned on by the interval timer. This alarm reminds the operator of the vehicle to remove the key from the ignition switch. If the buzzer sounds and the key is not removed from the ignition switch within a predetermined time interval the interval timer shuts the buzzer off.

5 Claims, 8 Drawing Figures

3,723,677

INVENTOR.
Alan Arias

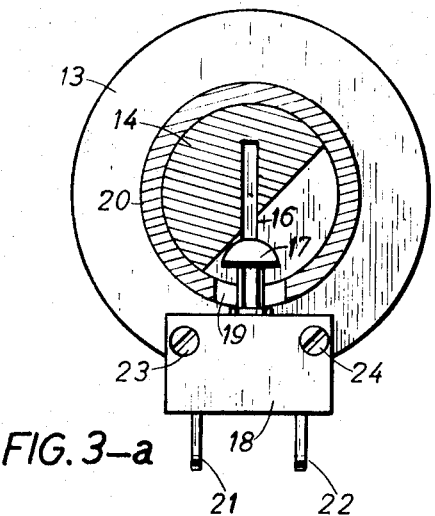
FIG. 3-a
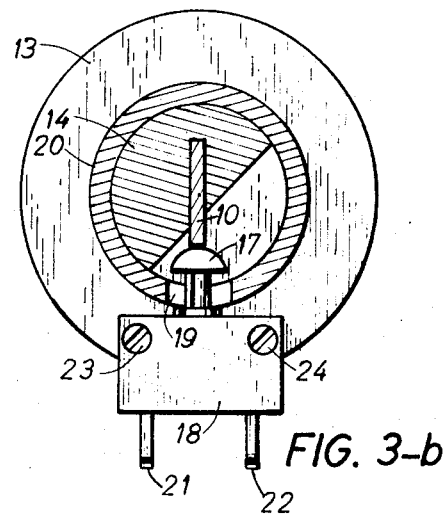
FIG. 3-b
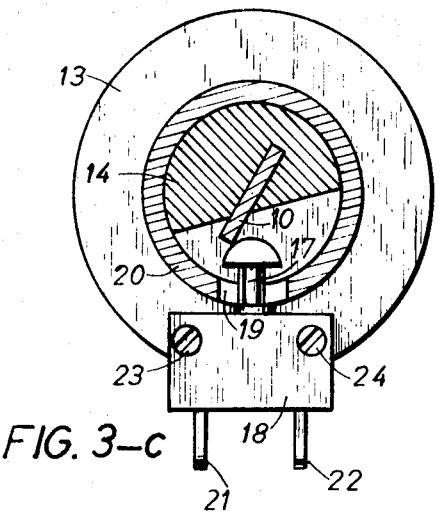
FIG. 3-c
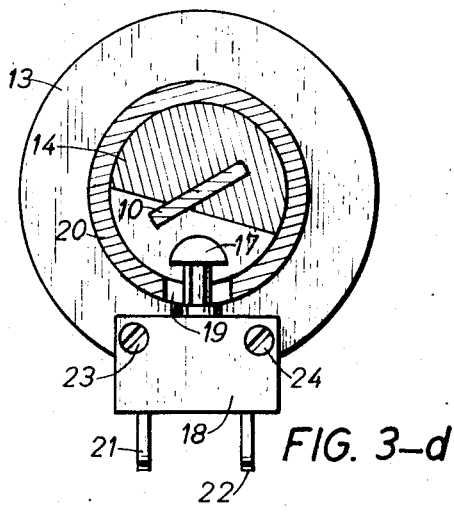
FIG. 3-d
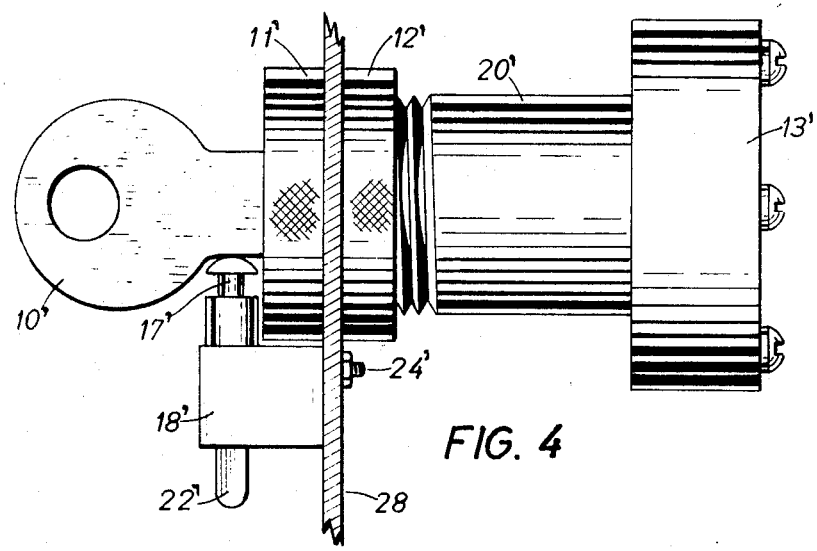
FIG. 4
INVENTOR.
Alan Arias

IGNITION KEY ALARM

BACKGROUND OF THE INVENTION

This invention relates to new and useful improvements in alarms and more particularly to alarms that are activated when ignition keys are inadvertently left in ignition or motor starting switches of the type used to start the engines of automobiles, motor boats, airplanes, and many other kinds of vehicles.

In many instances, vehicles such as automobiles and trucks are stolen because their drivers forgot to remove the keys from the vehicles' ignition switches. On the other hand, in many vehicles, the ignition key is also the door key and in many instances drivers are locked out of their own vehicles because they inadvertently left the keys in the ignition switches. The present invention minimizes these and other dangers and disadvantages by activating an alarm whenever the driver or operator of a vehicle shuts off the engine and forgets to remove the key from the ignition switch.

My invention is particularly applicable for use in conjunction with rotary ignition or motor starting switches of the type commonly used in automobiles, motor boats, airplanes, and many other kinds of vehicles. To facilitate understanding the explanation that follows, it will be assumed that the aforementioned ignition switch has an off position and at least one on or ignition position. It will also be assumed that the ignition key can be inserted in or removed from the ignition switch only when the ignition switch is in its off position and that this off position is reached by the counterclockwise rotation of the key in the ignition switch. The above assumptions should not be construed as limiting the type of rotary ignition switch with which my invention can be used.

SUMMARY OF THE INVENTION

My invention consists in part of an electrical auxiliary switch of the momentary contact type with normally open contacts which auxiliary switch is actuated by the ignition key. In one embodiment of the auxiliary switch part of my invention, this auxiliary switch is affixed to the ignition switch and the actuator or the actuator lever of said auxiliary switch makes contact with the shank of the ignition key through openings in the shell and in the plug or cylinder of the ignition switch. In another embodiment of the auxiliary switch part of my invention the actuator or the actuator lever of the auxiliary switch makes contact with the shank of the ignition key from outside the ignition switch. In the above described embodiments of my invention, the contacts of the auxiliary switch are open either when the ignition switch is in its on position or when the ignition key is out of the ignition switch. On the other hand, the contacts of the auxiliary switch are closed only when the ignition key is in the ignition switch and, in addition, the ignition switch is in its off position.

Depending upon the position of the ignition key in the ignition switch as described above, the auxiliary switch opens or closes an electrical circuit comprising said auxiliary switch, a source of electrical energy, an electrically actuated interval timing means, and an electrically actuated audible or visual alarm means. When the ignition key is positioned so as to close the auxiliary switch, this auxiliary switch closes the above mentioned electrical circuit and the interval timing means is energized. Then, unless the auxiliary switch is opened (by moving the ignition key) before a predetermined delay time $t_1$, the load switch or load relay of the interval timing means closes the electrical circuit of the alarm means and this alarm means is thereby activated. The alarm means is deactivated by moving the ignition key so as to open the auxiliary switch. If the alarm means is not deactivated by the vehicle's operator it is deactivated automatically by the interval timing means after another predetermined interval of time $t_2$. Moving the ignition key so as to open the auxiliary switch resets the interval timing means.

It is, therefore, an object of the present invention to provide improved means for activating an alarm in a motorized vehicle whenever the key of the ignition or motor starting switch of said vehicle is inadvertently left in the ignition switch after stopping the vehicle's engine.

Another object of the invention is to provide an ignition key alarm for motorized vehicles for reducing the inconvenience of lockouts from the vehicle.

Another object of the invention is to provide an alarm for motorized vehicles for reducing the danger that said vehicles be stolen when the keys are inadvertently left in the ignition switches.

Other objects of the present invention will become apparent from the specification that follows and from the accompanying drawings.

BRIEF DESCRIPTION OF THE DRAWING

FIG. 3-a is a sectional view taken substantially on the line 3—3 of FIG. 2 but with the ignition key removed.

FIG. 3-b is a sectional view taken substantially on the line 3—3 of FIG. 2 with the key in the ignition switch and this ignition switch in its off position.

FIG. 3-c is a sectional view taken substantially on the line 3—3 of FIG. 2 with the ignition switch turned clockwise to its on position.

FIG. 3-d is a sectional view taken substantially on the line 3—3 of FIG. 2 with the ignition switch turned further clockwise to a second on or ignition position.

FIG. 4 is a side elevational view, partially cut away, of an ignition switch and an auxiliary switch mounted on a panel, the combination comprising another embodiment of the ignition switch part of my invention.

DESCRIPTION OF THE PREFERRED EMBODIMENTS

Figure 1:
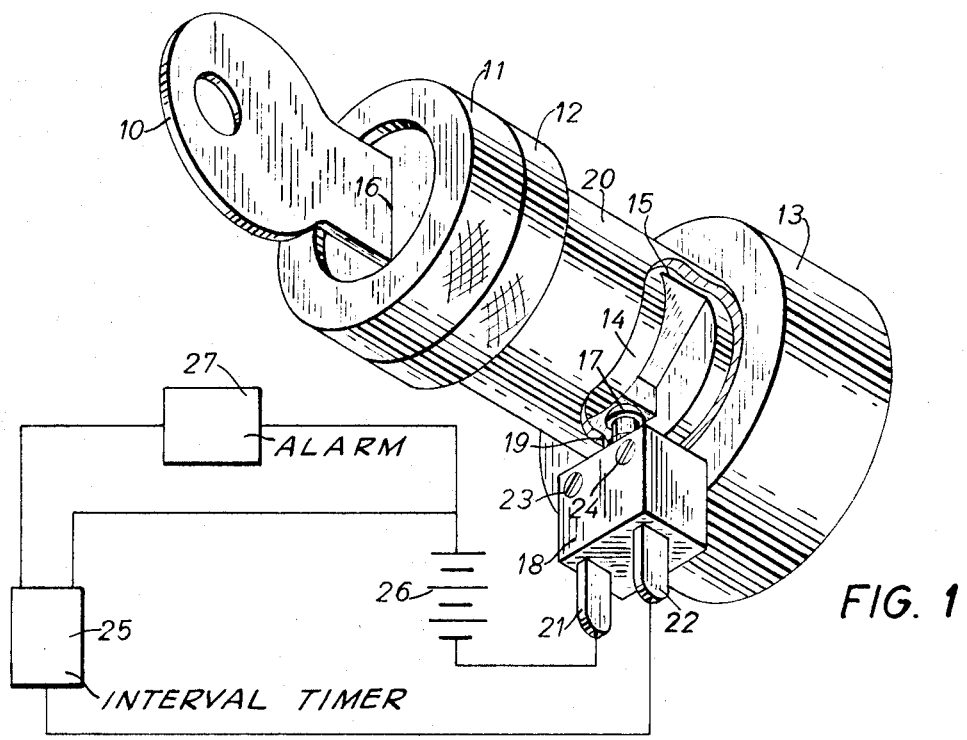
FIG. 1 is a perspective view, partially cut away, depicting the ignition switch part of my invention together with an schematic of an electrical circuit, depicting altogether one preferred embodiment of my invention.
Figure 2:
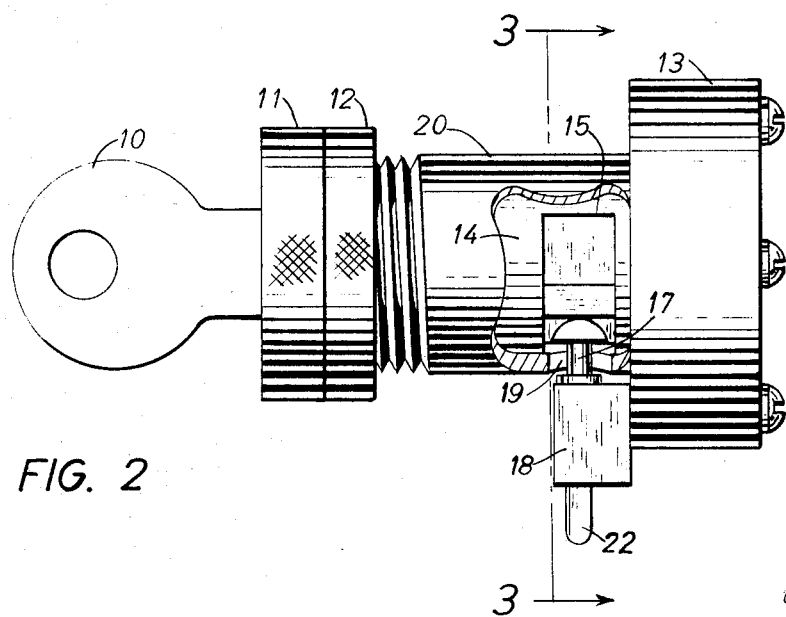
FIG. 2 is a side elevational view, partially cut away, of the same ignition switch shown in FIG. 1.

In FIGS. 1 to 3-d, inclusive, is shown a rotary type ignition or motor starting switch which in common with conventional ignition switches has an ignition key 10, threaded nuts 11 and 12 or equivalent means for securing the ignition switch to a panel (not shown), and a housing 13 for the electrical contacting and switching means (not shown) of the ignition switch proper. Also, in common with most conventional rotary ignition switches, the ignition switch of the present invention preferably has a pin tumbler or equivalent mechanism in the lock section of said ignition switch to prevent its use by anauthorized persons.

The plug or cylinder 14 has a transverse channel 15, so that when the key 10 is inserted in the keyhole 16 the straight edge of the shank of said key pushes the actuator 17 thereby closing the electrical contacts (not shown) inside the auxiliary switch 18. Preferably, channel 15 in plug 14 is shaped so that when this plug rotates it does not touch the actuator 17. The tip or head of the actuator 17 which contacts the straight edge of the shank of key 10 is either rounded or otherwise shaped, so as not to impede either the sliding or the rotation of the key 10. The actuator 17 moves slidably (up and down in FIGS. 2 to 3-d, inclusive) inside hole 19 in the shell 20. As already mentioned, the auxiliary switch 18 is a momentary contact switch with normally open contacts. This auxiliary switch 18 is preferably a sensitive switch or microswitch and it has electrical terminals 21 and 22. Although the auxiliary switch 18 is shown fastened to the ignition switch housing 13 by means of screws 23 and 24, other fastening means such as riveting, gluing, or welding as well as fastening said auxiliary switch 18 to other parts of the ignition switch or to the vehicle's structure are suitable alternate fastening means and methods.

As shown in the schematic electrical circuit of FIG. 1, the auxiliary switch 18 is in series with an electrically actuated interval timing means 25 and a source of electrical energy (here depicted as an electrical storage battery) 26. When key 10 is positioned in the ignition switch so as to push on the actuator 17 and thereby close the electrical contacts of the auxiliary switch 18, an electrical current flows through the electrical circuit formed by said auxiliary switch, the interval timing means 25, and the source of electrical energy 26, thereby energizing the timing mechanism of said interval timing means. If after a preset time $t_1$ (5 seconds, for example) the auxiliary switch 18 is still closed, the load switch or load relay of the interval timing means 25 closes the electrical circuit formed by said auxiliary switch, the load switch of the interval timing means 25, the electrically actuated alarm means 27, and the source of electrical energy 26, thereby activating said alarm means. Either turning the ignition switch to one of its on or ignition positions by means of key 10 or withdrawing said key from the keyhole 16 opens the auxiliary switch 18 thereby shutting off both the interval timing means 25 and the alarm means 27. If the key 10 is not moved within a predetermined time interval $t_2$ (60 seconds, for example) after the alarm means 27 is activated, the auxiliary switch 18 remains closed and the interval timing means 25 automatically opens its load switch thereby deactivating the alarm means 27.

The operation of this invention will be further clarified by describing a typical cycle of events. When the key 10 is out of the ignition switch, the actuator 17 is up, as shown in FIG. 3-a; hence, the auxiliary switch 18 is open and the alarm system is in the deactivated state. When the operator of the vehicle inserts the key 10 in the keyhole 16, the straight edge of the shank of said key presses on the actuator 17, as shown in FIG. 3-b, thereby closing the auxiliary switch 18. Although closing the auxiliary switch 18 energizes the interval timing means 25, normally the vehicle's operator turns the ignition switch to the on or ignition position before time $t_1$ and, consequently, the alarm means 27 is not activated. The turning of the ignition switch to an on or ignition position releases the actuator 17, as shown in FIG. 3-c. The release of the actuator 17 opens the auxiliary switch 18 and thereby the interval timing means 25 returns to the original, deactivated state. Turning the ignition switch from an on or ignition position to another of its ignition or on positions does not affect the position of the actuator 17, as shown in FIG. 3-d, and, therefore, the auxiliary switch 18 remains open. When the operator turns the vehicle's engine off by rotating the ignition switch counterclockwise to its off position, the straight edge of the shank of key 10 presses on the actuator 17, as shown in FIG. 3-b, closing the auxiliary switch 18 and thereby energizing the interval timing means 25. If the vehicle's operator removes the key 10 from the ignition switch before the predetermined time delay $t_1$, the actuator 17 is released, as shown in FIG. 3-a, and, as already explained, the interval timing means 25 returns to its deactivated state. However, if said operator (inadvertently) leaves the key 10 in the ignition switch after turning it to its off position, the alarm means 27 is activated after the predetermined time delay $t_1$ thereby reminding said operator to remove the key from the ignition switch. If the operator does not retrieve the key 10 from the ignition switch within another predetermined time interval $t_2$, the interval timing means 25 opens its load switch and thereby deactivates the alarm means 27. The automatic deactivation of the alarm means is incorporated in the invention so that the fact that the key was inadvertently left in the ignition switch is not unduly advertised to would be trespassers.

The source of electrical energy 26 is depicted in FIG. 1 as an electrical storage battery because in most vehicles this is the most convenient means of powering my invention. However, any other convenient source of electrical energy can be used.

As regards the interval timing means 25, there are many conventional types of interval timers or interval timing relays which when electrically energized can perform the sequence of operations required in my invention, to wit: close an electrical circuit after a predetermined time delay $t_1$; open the same electrical circuit after another predetermined time interval $t_2$; return to the original, deactivated state by disconnecting said timer from the source of electrical energy, at any time during the cycle; and repeat the cycle of operations described above by electrically energizing the timing mechanism of said timer or relay. Some of the types of interval timers or interval timing relays that can be used in my invention will be described very briefly, for purposes of identification.

Thermal interval timers or interval timing relays have a timing mechanism that is actuated by the thermal expansion of an element of the timer or relay when heated by an electric current. Electromechanical interval timers or interval timing relays have either an electric motor or a solenoid that powers the timing mechanism. Electronic timers have solid state devices in an electrical circuit that supply electrical signals in the proper time sequence and, with the possible exception of the load relay, have no moving parts. In some of the above types of interval timers, the load switch or relay may be an electronic switch or relay.

The alarm means 27 can be either audible or visual. In most types of motorized vehicles, an audible alarm such as an electrically powered buzzer, horn, or bell is the preferred alarm means. In noisy environments, or for some other reason, a visual alarm means such as a light may be preferable.

The embodiment of my invention shown in FIG. 4 is particularly useful in combination with conventional rotary ignition switches because, in the majority of cases, these ignition switches need no modification at all. As in the first embodiment already described, an auxiliary switch 18' is closed or opened through its actuator 17' by the movements of the ignition key 10'. Normally, the auxiliary switch 18' is affixed to the panel 28 of the vehicle. However, the auxiliary switch 18' can also be affixed to the ignition switch or to some other convenient part of the vehicle's structure. The main difference between this and the first embodiment already described is that the actuator 17' contacts the edge of the shank of key 10' from outside the ignition switch. As in the first embodiment, the tip or head of the actuator 17' is rounded or otherwise shaped so as not to interfere with the movements of the ignition key 10'. In all other respects, the elements bearing primed numbers in FIG. 4 are equivalent to the elements bearing the same unprimed numbers in FIGS. 1 to 3-d, inclusive.

Figure 5:
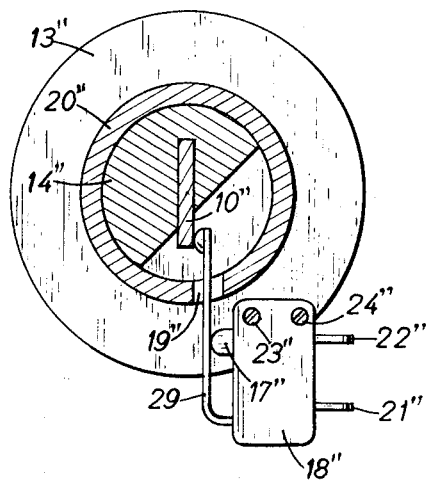
FIG. 5 is a sectional view of still another ignition switch, this view being substantially equivalent to that shown in FIG. 3-b and showing a different type of auxiliary switch afixed to the ignition switch, the combination comprising another embodiment of the ignition switch part of my invention.

In the embodiment illustrated in FIG. 5, the actuator 17'' of the auxiliary switch 18'' is actuated by the rocking movements of the lever 29, as this lever is pushed or released by one side of the ignition key 10''. The key side of the tip of the lever 29 is rounded or otherwise shaped so as not to impede the movements of the key 10''. The other elements shown in FIG. 5 are equivalent to those bearing the same numbers in FIGS. 1 to 4, inclusive.

With reference to FIGS. 1 to 3-d and 5, in relatively large ignition switches, small auxiliary switches equivalent in function to the auxiliary switches 18 or 18'' fit inside the channel 15 in plug 14. In this case, the opening 19 for the actuator 17 or opening 19'' for the lever 29 in not necessary. However, other openings in the shell 20 or 20'' are used for connecting said small auxiliary switch electrically and for fastening it to the shell.

The foregoing description of the invention has been given with a certain degree of particularity in order to make its meaning clear and, consequently, it is understood that the present disclosure of the preferred embodiments of the invention has been made only by way of example and modifications will be obvious to those skilled in the art.

What is claimed is:

1. In an ignition or motor starting switch of the rotary, conventional type used in motorized vehicles, this ignition switch having a shell, and a cylinder rotatable inside this shell, and this cylinder also having a keyhole, the ignition switch being operated by inserting an ignition key in said keyhole while the ignition switch is in its off position and then turning said cylinder with said key so as to thereby actuate the switching mechanism of the ignition switch, the improvement consisting of
   an opening or channel in said cylinder exposing said keyhole, a hole in said shell exposing said opening in said cylinder, and an auxiliary switch of the momentary, normally open contact type, this auxiliary switch being located in a fixed spatial relationship with respect to said shell, the actuator of the auxiliary switch passing through the hole in the shell, and ending inside the opening in the cylinder, the tip of this actuator intercepting the path of the ignition key, this key cammingly biasing said actuator so as to thereby actuate the auxiliary switch to its on position either when the ignition key is inserted in the keyhole while said ignition switch is in its off position or when the ignition switch is turned from an on position to its off position by means of said ignition key.

2. A device as in claim 1 except that said auxiliary switch is a sensitive type switch or microswitch.

3. In an ignition or motor starting switch of the rotary, conventional type used in motorized vehicles, this ignition switch having a shell, and a cylinder rotatable inside said shell, and this cylinder also having a keyhole, the ignition switch being operated by inserting an ignition key in said keyhole while the ignition switch is in its off position and then turning said cylinder with said key so as to thereby actuate the switching mechanism of the ignition switch, the improvement consisting of
   an opening or channel in said cylinder exposing said keyhole, a hole in said shell exposing said opening in said cylinder, and an auxiliary sensitive switch of the momentary, normally open contact type, this auxiliary switch being located in a fixed spatial relationship with respect to said shell, this auxiliary switch having its actuator operated by a lever, this lever passing through the hole in the shell and ending inside the opening in the cylinder, the tip of the lever intercepting the path of the ignition key, this key cammingly biasing said lever so as to thereby actuate the auxiliary switch to its on position either when the ignition key is inserted in the keyhole while the ignition switch is in its off position or when the ignition switch is turned fron an on position to its off position by means of said ignition key.

4. In an ignition or motor starting switch of the rotary, conventional type used in motorized vehicles, this ignition switch having a shell, and a cylinder rotatable inside said shell, and this cylinder also having a keyhole, the ignition switch being operated by inserting an ignition key in said keyhole while the ignition switch is in its off position and then turning said cylinder with said key so as to thereby actuate the switching mechanism of the ignition switch, the improvement consisting of
   an auxiliary microswitch of the momentary, normally open contact type, this auxiliary switch being located in a fixed spatial relationship with respect to the shell of the ignition switch, this auxiliary switch having its actuator outside the ignition switch, the tip of said actuator intercepting the path of the shank of the ignition key, said shank of said ignition key cammingly biasing said actuator so as to thereby prompt said auxiliary switch to its on position either when the ignition key is inserted in said keyhole while the ignition switch is in its off position or when the ignition switch is turned from an on position to its off position by means of said key.

5. In an ignition or motor starting switch of the rotary, conventional type used in motorized vehicles, this ignition switch having a shell, and a cylinder rotatable inside said shell, and this cylinder also having a keyhole, the ignition switch being operated by inserting an ignition key in said keyhole while the ignition switch is in its off position and then turning said cylinder with said key so as to thereby actuate the switching mechanism of the ignition switch, the improvement consisting of an auxiliary microswitch of the momentary, normally open contact type, this auxiliary switch being located in a fixed spatial relationship with respect to the shell of the ignition switch, this auxiliary switch having an actuator operated by a lever, said actuator and said lever being located outside the ignition switch, and the free end of said lever intercepting the path of the shank of the ignition key, the shank of this key cammingly biasing the end of the lever so as to thereby prompt said auxiliary switch to its on position either when the ignition key is inserted in said keyhole while the ignition switch is in its off position or when the ignition switch is turned from an on position to its off position by means of said key.

* * * * *